United States Patent
Burgess et al.

(10) Patent No.: US 10,792,606 B2
(45) Date of Patent: Oct. 6, 2020

(54) VACUUM CLEANER

(71) Applicant: TTI (MACAO COMMERCIAL OFFSHORE) LIMITED, Macau (MO)

(72) Inventors: Roderick Burgess, Charlotte, NC (US); Robert Patrick Warren, Charlotte, NC (US); Joseph M. Lehman, New Albany, OH (US)

(73) Assignee: TTI (Macao Commercial Offshore) Limited, Praia Grande (MO)

( * ) Notice: Subject to any disclaimer, the term of this patent is extended or adjusted under 35 U.S.C. 154(b) by 0 days.

(21) Appl. No.: 16/293,759

(22) Filed: Mar. 6, 2019

(65) Prior Publication Data

US 2019/0275456 A1   Sep. 12, 2019

Related U.S. Application Data

(60) Provisional application No. 62/639,601, filed on Mar. 7, 2018.

(51) Int. Cl.
*B01D 46/42* (2006.01)
*A47L 9/12* (2006.01)
(Continued)

(52) U.S. Cl.
CPC .......... *B01D 46/4272* (2013.01); *A47L 9/102* (2013.01); *A47L 9/12* (2013.01);
(Continued)

(58) Field of Classification Search
None
See application file for complete search history.

(56) References Cited

U.S. PATENT DOCUMENTS

| 3,616,622 | A | | 11/1971 | Friedman |
| 5,766,283 | A | * | 6/1998 | Bumb .................. A47L 9/1427 55/367 |

(Continued)

FOREIGN PATENT DOCUMENTS

ES   2313905 T3   3/2009

OTHER PUBLICATIONS

English Machine Translation of ES 2313905, attached as pdf (Year: 2009).*

(Continued)

*Primary Examiner* — Brian D Keller
(74) *Attorney, Agent, or Firm* — Michael Best & Friedrich LLP

(57) ABSTRACT

Embodiments are directed to a vacuum cleaner and removably attachable filter. The filter is configured to separate debris from a flow of fluid drawn through the suction inlet. The filter includes a housing forming a first volume and a filter media forming a second inner volume. The filter media is coupled to the housing such that the first and second inner volumes together at least partially define a collection container configured to store debris separated by the filter media from the flow of fluid. The filter further includes an inlet opening that extends through the housing to provide fluid communication into the collection container such that the flow of fluid with the debris can flow into the collection container such that the flow of fluid with the debris can flow into the collection container and a relatively clean flow of fluid exits through the filter media.

14 Claims, 11 Drawing Sheets

(51) Int. Cl.
*A47L 9/10* (2006.01)
*A47L 9/32* (2006.01)
*A47L 9/28* (2006.01)
*B01D 46/02* (2006.01)
*A47L 9/14* (2006.01)
*A47L 9/02* (2006.01)

(52) U.S. Cl.
CPC ............... *A47L 9/14* (2013.01); *A47L 9/1445* (2013.01); *A47L 9/1454* (2013.01); *A47L 9/2868* (2013.01); *A47L 9/322* (2013.01); *B01D 46/02* (2013.01); *A47L 9/02* (2013.01); *B01D 2265/023* (2013.01); *B01D 2271/02* (2013.01); *B01D 2279/55* (2013.01)

(56) References Cited

U.S. PATENT DOCUMENTS

| | | | |
|---|---|---|---|
| 8,449,639 B2* | 5/2013 | Sauer | A47L 9/1454 55/367 |
| 10,053,841 B2* | 8/2018 | Mahdjoubi Namin | E03C 1/055 |
| 2017/0296014 A1 | 10/2017 | Warren et al. | |

OTHER PUBLICATIONS

International Search Report and Written Opinion for Application PCT/US2019/020875, dated May 6, 2019, 14 pages.

* cited by examiner

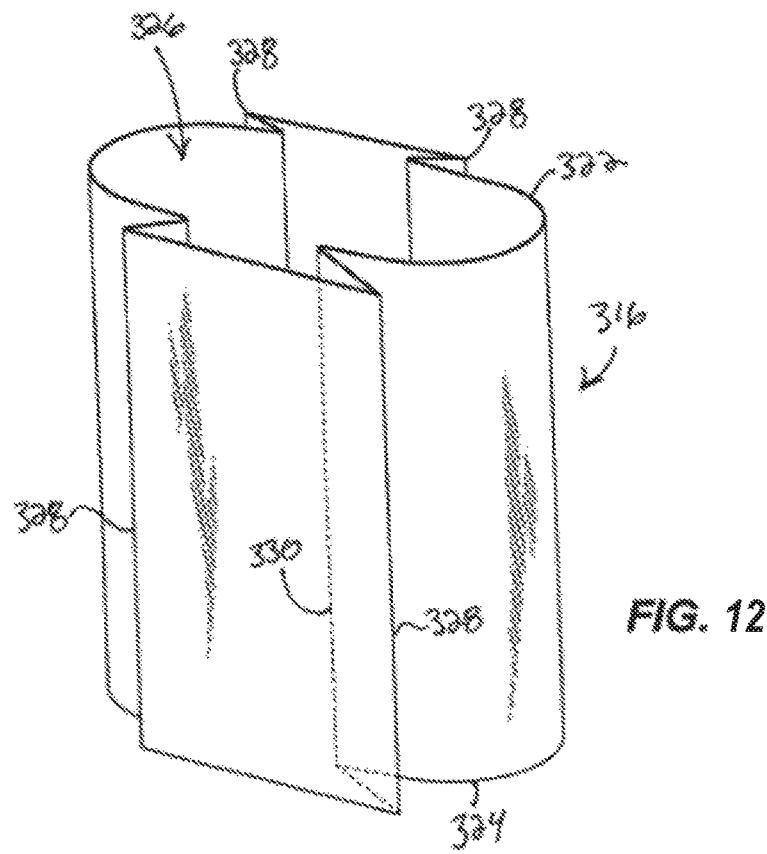
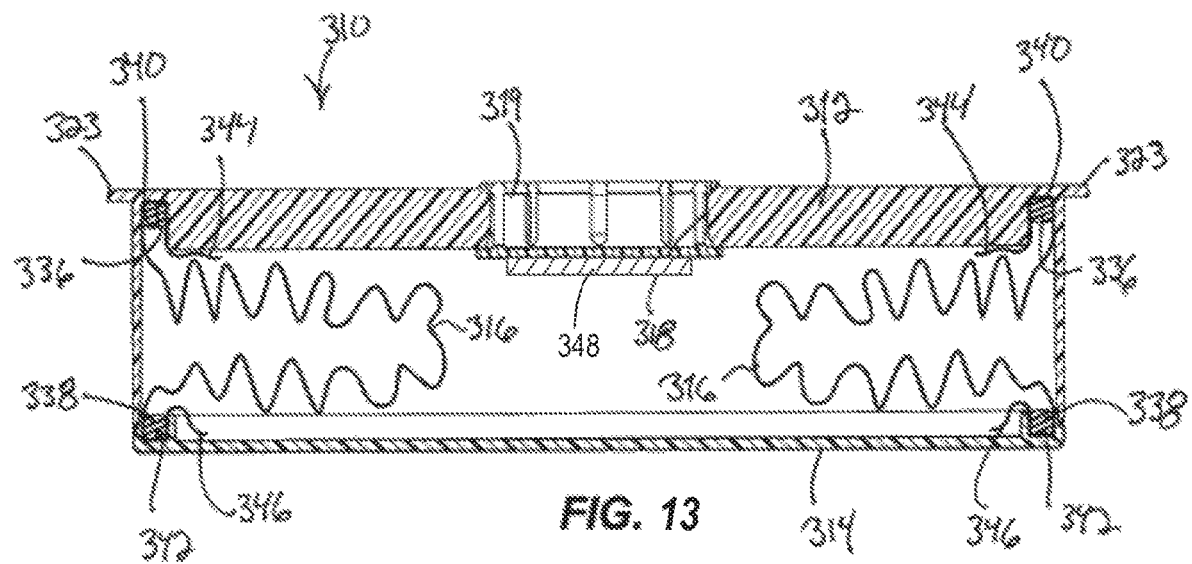

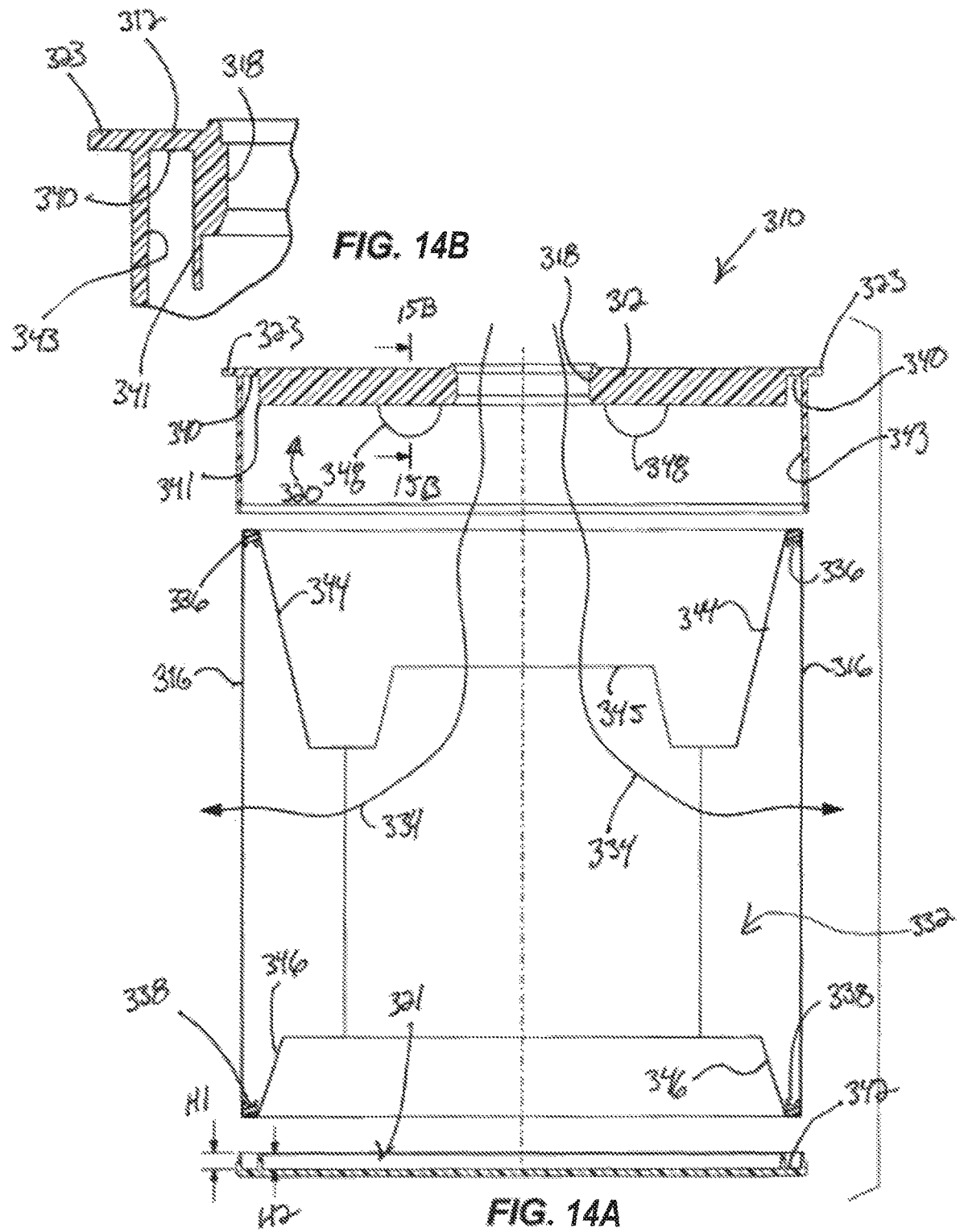

VACUUM CLEANER

CROSS-REFERENCE TO RELATED APPLICATIONS

This application claims priority to U.S. Provisional Patent Application No. 62/639,601 filed Mar. 7, 2018, the entire contents of which are hereby incorporated by reference herein.

FIELD OF THE INVENTION

The present invention relates to vacuum cleaners, and more particularly, vacuum cleaner filter bags.

BACKGROUND

Some types of vacuum cleaners include a filter bag for collecting and storing debris while filtering the air drawn through the vacuum with the debris. Once the filter bag is full, the bag is disconnected from the vacuum and replaced with a new bag. In prior vacuum cleaners, it has been necessary for a user to touch the bag in order to disconnect the bag from the vacuum and dispose of the bag, which some consumers do not prefer because of the dirt and debris inside the bag.

SUMMARY

In one embodiment, a vacuum cleaner is disclosed including a suction inlet and a suction source configured to draw debris through the suction inlet, a conduit in fluid communication with the suction inlet, the conduit including a first magnetic member. The vacuum further includes a filter having an inner volume configured to collect debris from the conduit, the filter having a valve releasably connected to a filter inlet opening, the valve including a second magnetic member, the first and second magnetic members being attracted to one another. The filter is moveable from a first position to a second position. The filter in the first position is in fluid communication with the conduit with the valve being disengaged from the filter inlet opening to collect the debris. The filter in the second position is disconnected from the conduit with the valve closing the filter inlet opening.

In another embodiment, a filter is disclosed including the filter configured to separate debris from a flow of fluid in a vacuum cleaner having a conduit for coupling to the filter, the conduit including a conduit magnetic member. The filter includes a housing, a filter media coupled to the housing to form a collection container having an inner volume configured to store debris separated by the filter media from the flow of fluid. The filter further includes an inlet opening extending through the housing and a valve releasably connected to the inlet opening. The valve is movable between an opened position and a closed position. The valve includes a valve magnetic member. The valve magnetic member and conduit magnetic member are attracted to one another. The inlet opening provides fluid communication into the collection container when the valve is in the opened position such that the flow of fluid with the debris can flow into the collection container and a relatively clean flow of fluid exits through the filter media.

Other aspects of the invention will become apparent by consideration of the detailed description and accompanying drawings.

BRIEF DESCRIPTION OF THE DRAWINGS

FIG. 2 is a cross-sectional view of the handheld vacuum cleaner taken along line 2-2 of FIG. 1.

FIG. 12 is a perspective view of the filter of FIG. 11, illustrating filter media of the filter without an upper and lower housing.

FIG. 13 is a cross-sectional view of the filter in the collapsed position.

FIG. 14A is an exploded cross-sectional view of the filter in the expanded position.

FIG. 14B is a cross-sectional view of the filter along line 15B-15B of FIG. 14A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
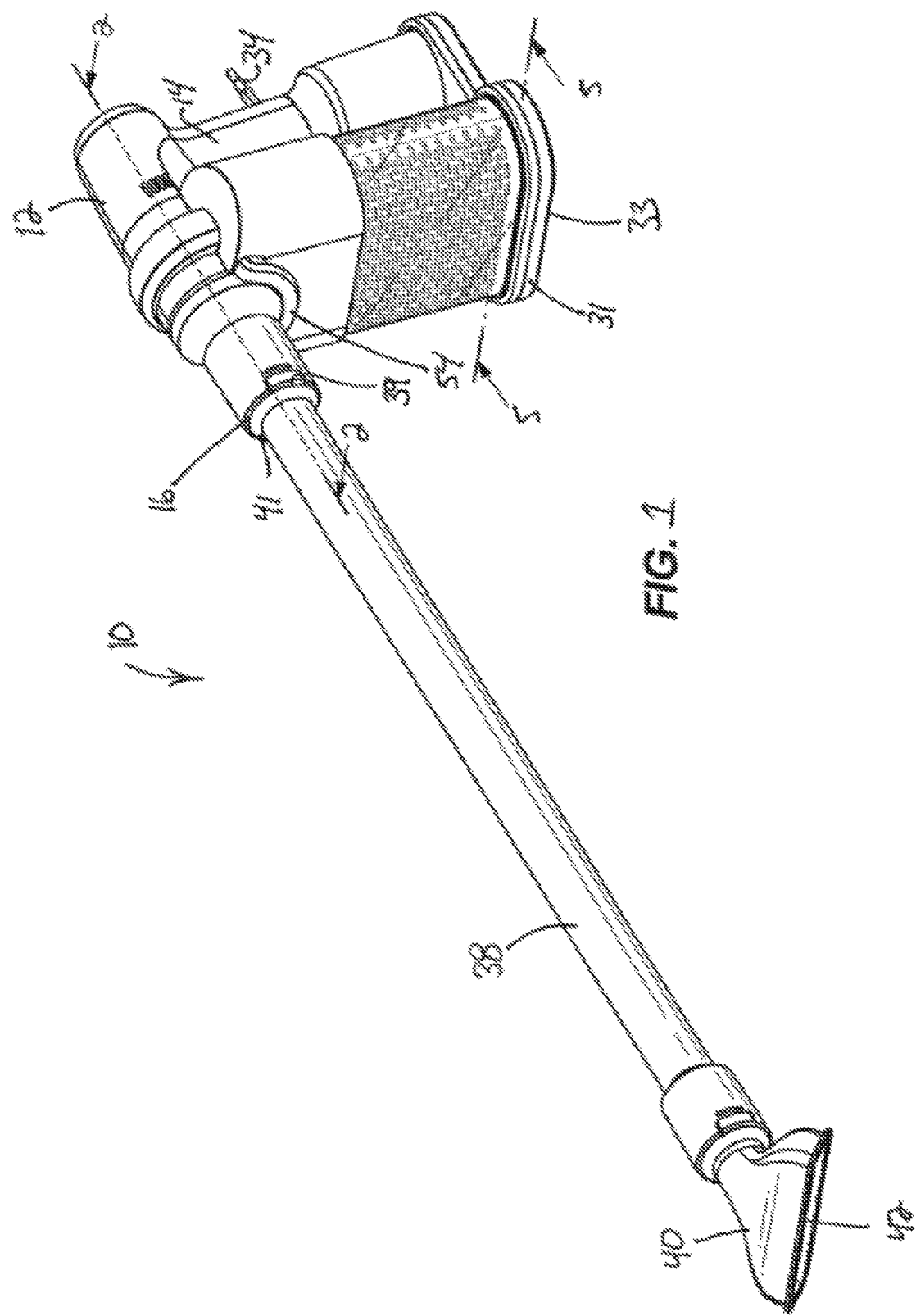
FIG. 1 is a front perspective view of a handheld vacuum cleaner according to an embodiment of the invention.
Figure 3:
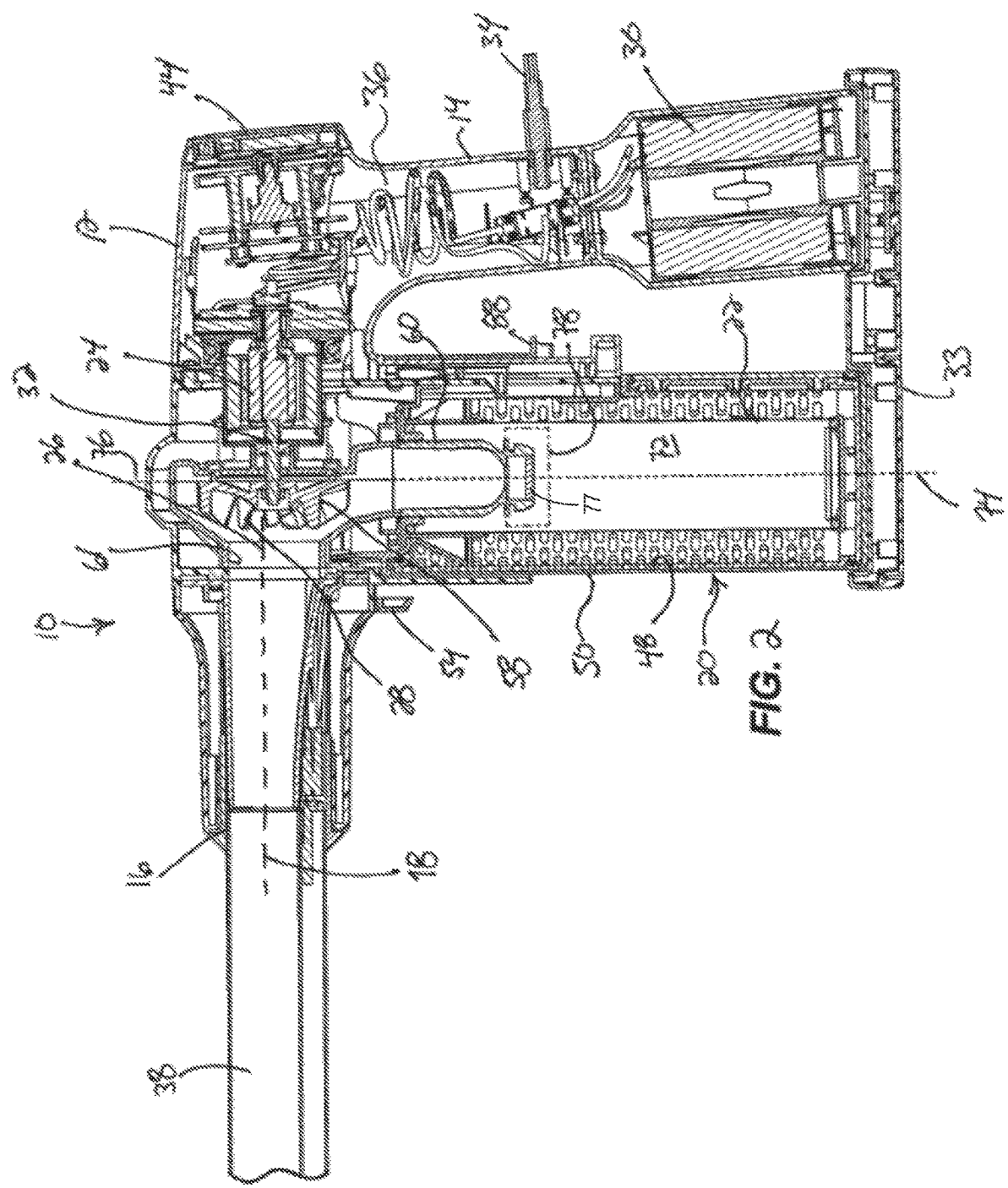
FIG. 3 is a rear perspective view of the handheld vacuum cleaner of FIG. 1.
Figure 3:
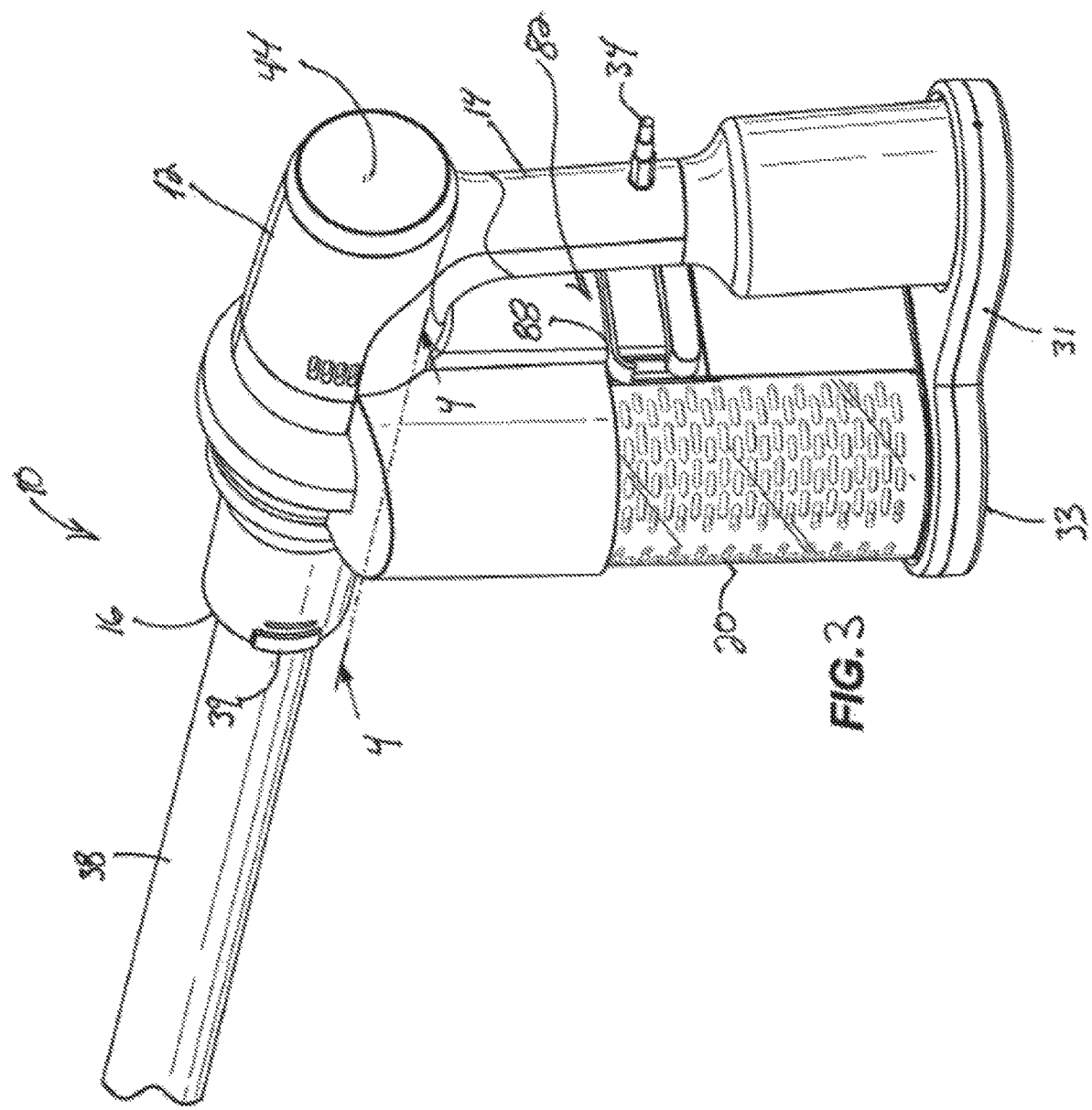

FIGS. 1-3 illustrate a vacuum cleaner 10, such as a handheld vacuum cleaner, including a main body 12, a handle 14 defining a portion of the main body 12, and a suction inlet 16 for drawing airflow mixed with debris along an inlet axis 18 from a surface. The vacuum cleaner 10 includes a debris separator and a dirt collection container 72 in fluid communication with the suction inlet for collecting the debris. In the illustrated embodiment, the debris separator and the dirt collection container 72 are formed by a filter 22 enclosed by an outer housing 20 (FIG. 2) and releasably installed in or coupled to the main body 12. The handle 14 is grasped by an operator to operate and facilitate in maneuvering the vacuum cleaner 10 to draw in debris during a cleaning operation. The debris is directed toward and collected in the filter 22. As will be discussed in more detail below, when an operator is done cleaning, the filter 22 can be removed and disposed of without touching or handling the filter 22 and a new filter is easily loaded into the vacuum 10. Although the vacuum cleaner 10 of the illustrated embodiment is shown as a handheld vacuum, in other embodiments, the vacuum cleaner 10 may be other types of vacuums (e.g., canister vacuum, upright vacuum, backpack vacuum, robotic vacuum, etc.).

With continued reference to FIGS. 1-3, the vacuum cleaner 10 further includes a motor 24 having a rotational axis 26, a suction source or fan 28 operated by the motor 24, and a power supply 30 (e.g., battery or power cord) for supplying selective power to the motor 24. The motor 24 includes an output shaft 32 that is coupled to the fan 28 in order to drive the fan 28 about the rotational axis 26. In the illustrated embodiment, the rotational axis 26 is generally aligned with the inlet axis 18. In one alternative, the rotational axis and suction inlet axis are substantially co-axial. In yet another alternative, the motor 24 is positioned such that the rotational axis 26 intersects the inlet axis 18 at an angle such that the air flowing into the suction source 28 enters at an angle. The illustrated embodiment uses a battery for the power supply 30. The battery 30 is, for example, a lithium ion battery but could alternatively be other types of batteries. The battery 30 may be removable for recharging on a battery charger. Alternately or additionally, the battery 30 may be rechargeable in place when the vacuum 10 or an electrically connected storage base 31 is connected to a power cord 34 that is further plugged into a power source e.g., household power (120 volts, 230 volts, etc.). As illustrated, the battery 30 is positioned within the handle 14 and electrically connected to the motor 24 via a control circuit 36.

The vacuum cleaner 10 includes one or more bottom surfaces 33 upon which the vacuum cleaner is configured to be positioned on a horizontal surface. In the illustrated embodiment, the bottom surface 33 is formed by the outer housing 20 and the handle 14. Alternatively, the main body 12 is configured with the bottom surface 33.

Optionally, the vacuum cleaner 10 includes an accessory tool 38 such as a wand for cleaning surfaces. When connected to the suction inlet 16, the accessory tool 38 is in communication with the fan 28. While in use and attached to the suction inlet 16, an operator can grip the handle 14, the accessory tool 38, or both to move the vacuum cleaner 10 for cleaning. In the illustrated embodiment, the accessory tool 38 includes a cleaning head 40 accessory tool with an intake nozzle 42 that operates as a suction nozzle when connected to the suction inlet 16 for drawing debris from a surface. The cleaning head 40 accessory tool of the illustrated embodiment is usable with or without the wand 38 and is removable from the suction inlet 16 such that different cleaning heads can be used to clean surfaces (e.g., furniture, drapes, steps, etc.).

Figure 4:
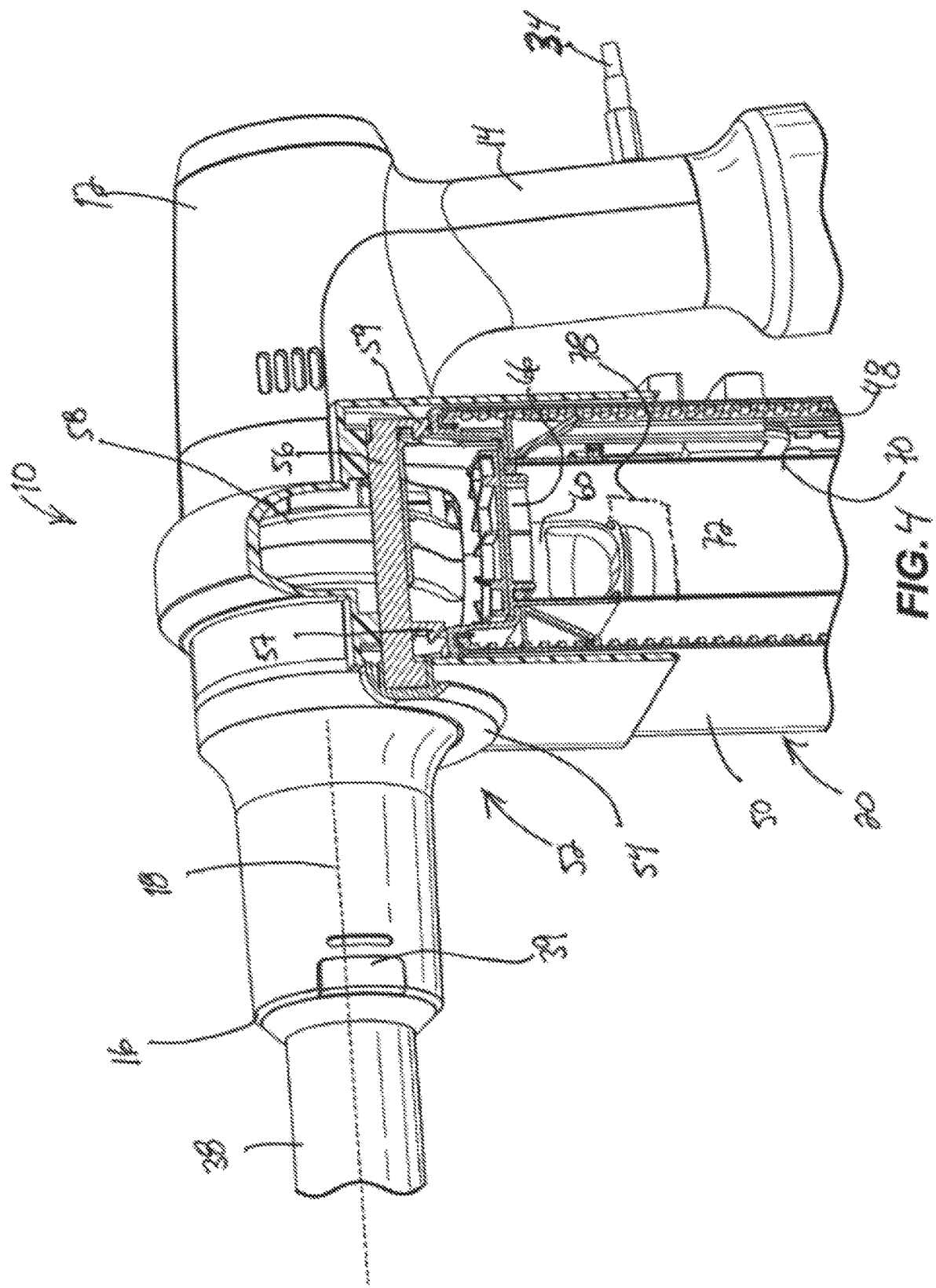
FIG. 4 is a cross-sectional view of the handheld vacuum cleaner taken along line 4-4 of FIG. 3.

With reference to FIG. 4, the vacuum cleaner further includes a filter 22 surrounding by an outer housing 20. In the illustrated embodiment, the outer housing 20 includes a porous structure 48 and a mesh fabric 50 that allows airflow leaving the filter 22 to exhaust through the porous structure 48 and the mesh fabric 50. In this embodiment, the porous structure of the outer housing 20 forms the air exhaust outlet for the vacuum cleaner 10. In alternative embodiments, the outer housing 20 is substantially impervious to airflow, and the airflow is ducted to an outlet formed by vents, louvers, apertures, or other opening. The vacuum cleaner 10 further includes a housing release mechanism 52 for selectively coupling the outer housing 20 to the main body 12. Specifically, the housing release mechanism 52 is capable of uncoupling the outer housing 20 from the main body 12. The housing release mechanism 52 includes an actuator 54 and a locking member 56 that is actuated by the actuator 54. In the illustrated embodiment, the actuator 54 is moveable with the locking members 56 and moveable along a direction parallel to the inlet axis 18 between a locked position (as shown in FIG. 4) and an unlocked position. In the locked position, the locking member 56 engages the outer housing 20 to couple the outer housing 20 to the main body 12. In the unlocked position, the locking member 56 disengages the outer housing 20 to uncouple the outer housing 20 from the main body 12. In the illustrated embodiment, the locking member 56 includes a first lock 57 and a second lock 59. The first lock 57 engages corresponding features connecting a first portion of the outer housing 20, such as a front wall, and the second lock 59 engages corresponding features connecting a second portion of the outer housing 20, such as a rear wall. As shown in FIG. 4, the locking member 56 is configured with the first lock 57 being in a spaced relationship with the second lock 59 spanning between the first portion of the outer housing 20 and the second portion of the outer housing 20. The actuator 54 actuates both the first lock 57 and the second lock 59.

Figure 5:
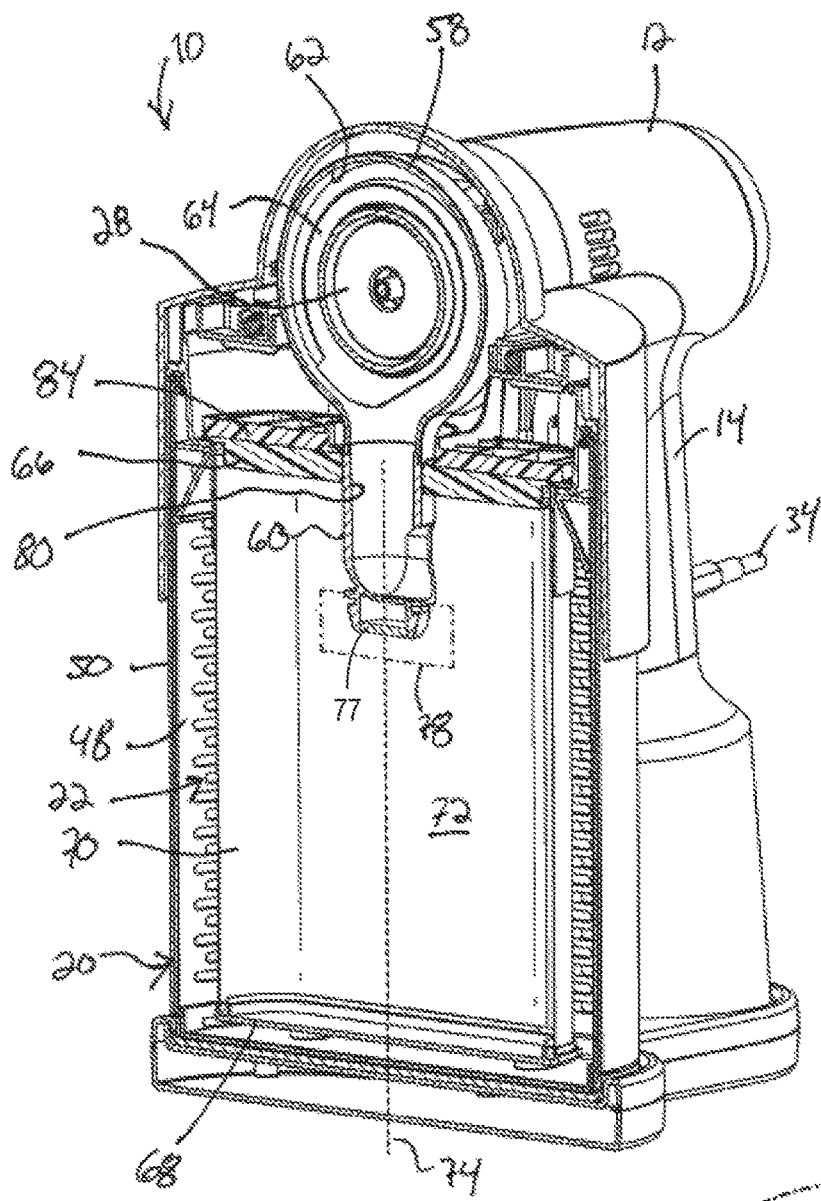
FIG. 5 is a cross-sectional view of the handheld vacuum cleaner taken along line 5-5 of FIG. 1, illustrating a filter coupled to the handheld vacuum cleaner.

With reference to FIG. 5, the vacuum cleaner 10 further includes a conduit 60 connected to the dirt collection container 72 and in fluid communication with the suction inlet 16 configured for directing airflow from the suction inlet 16 into the dirt collection container 72. In the illustrated embodiment, the conduit 60 extends into the collection container 72. The vacuum cleaner 10 further includes a scroll or volute 58 disposed between the suction inlet 16 and the conduit 60. The volute 58 includes a volute inlet 61, as shown in FIG. 2. In the illustrated embodiment, the volute inlet 61 is aligned with the suction inlet 16. In one alternative, the volute inlet 61 is coaxial with the suction inlet 16. The volute 58 further includes an inner periphery 62 that is spaced circumferentially away from an outer periphery 64 of the fan 28. That is, the volute 58 forms an airflow housing surrounding the fan 28. As such, the volute 58 is capable of directing air and debris traveling from the suction inlet 16, through the airflow housing surrounding the fan 28, and toward the conduit 60. In turn, the conduit 60 directs debris toward the filter 22. The conduit 60 extends from the volute 58 generally along a plane 76 defined by the fan 28 (FIG. 2). As illustrated, the suction inlet axis 18 is transverse to the plane 76 defined by the fan 28, and transverse to the conduit 60. As such, the handle 14 is arranged transverse to the suction inlet axis 18, and generally along the plane 76 defined by the fan 28. In the illustrated embodiment, the conduit 60 is generally vertical when the bottom surface of the vacuum cleaner 10 is positioned on a horizontal surface.

With continued reference to FIG. 5, the filter 22 of the illustrated embodiment is operably installed, or coupled, in the main body 12 and configured to separate debris from an airflow drawn through the suction inlet 16. An unused filter 22 may be provided in a collapsed position in the form of a pod or cartridge. In the illustrated embodiment, the filter 22 is formed by an upper housing 66 and a lower housing 68, and a filter media 70 interconnecting the upper housing 66 and the lower housing 68. The housings 66, 68 and the filter media 70 define the dirt collection container 72 (FIG. 5) in which the debris is collected. Specifically, the dirt collection container 72 is formed by an inner volume of each of the housings 66, 68 and an inner volume of the filter media 70. The inner volumes of the upper housing 66 and the lower housing 68 can be equal, or one of the volumes can be greater than the other. In various alternatives, the inner volumes of one or both of the upper housing 66 and the lower housing 68 are small or inappreciable relative to the inner volume of the filter media 70 due to the shape of the housing 66, 68. The upper housing 66 and the lower housing 68 can be formed from any suitable material, such as thermoplastic material, thermoset material, molded paper pulp, formed or molded filter media, or any other suitable material. In one embodiment the filter media 70 includes a nonwoven, HEPA filter material. The filter 22 is expandable from the collapsed position (not shown) and an expanded position (FIG. 5). Optionally, in the collapsed position, the lower housing 68 engages the upper housing 66, and the filter media 70 is encased by the upper and lower housings 66, 68. This provides a convenient way for the filter 22 to be stored, shipped, etc. In some embodiments, the upper housing 202 and/or the lower housing 204 includes a fastener (such as a clip, tab, friction fit, tape, shrink-wrap, film, hook-and-loop fastener, etc.) that releasably connects the housings 202, 204 in the collapsed position. In the expanded position, the lower housing 68 is released from the upper housing 66 and the filter media 70 is fully expanded. The filter 22 moves between the collapsed position and the expanded position along a dirt collection axis 74. As illustrated, the dirt collection axis 74 is generally aligned with the plane 76 defined by the fan 28 (FIG. 2), and the dirt collection axis 74 is generally aligned with the conduit 60. In various alternatives, the dirt collection axis 74 and conduit 60 are not aligned, and may be transverse.

Figure 6:
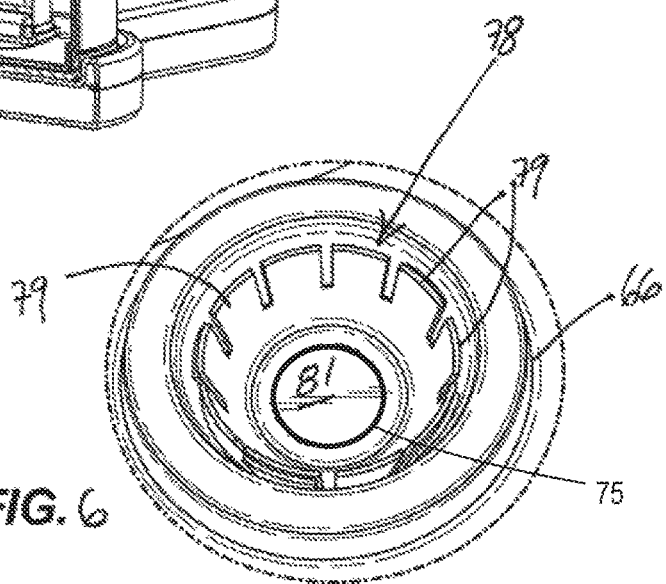
FIG. 6 is a perspective view of the filter, illustrating a valve seated within an inlet opening of the filter.
Figure 9:
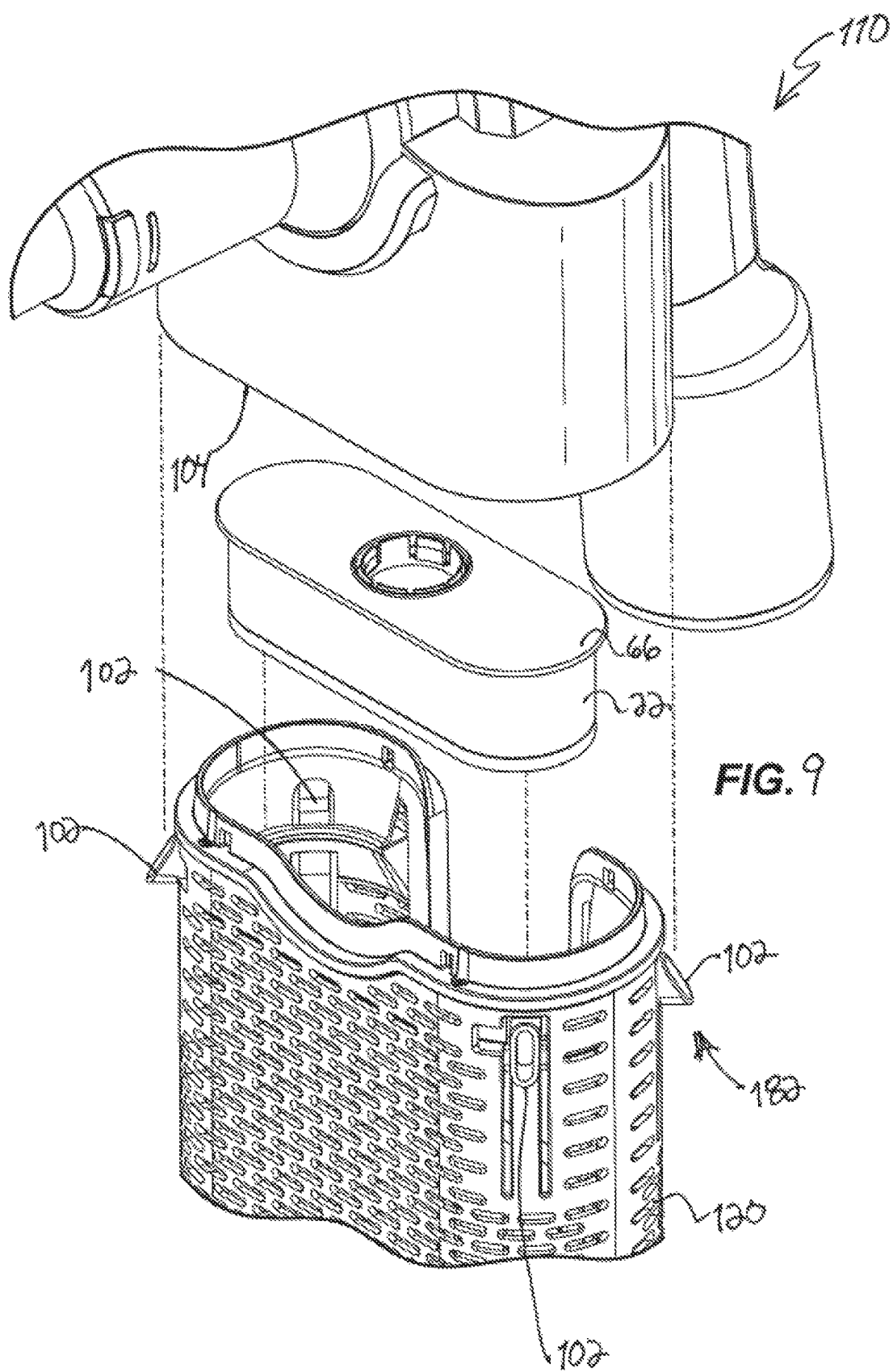
FIG. 9 is a partially exploded view of a handheld vacuum cleaner according to another embodiment.

With reference to FIGS. 5 and 6, the filter 22 further includes a valve 78 releasably connected to an inlet opening 80. Specifically, the upper housing 66 includes an inlet port forming the inlet opening 80 that allows debris to enter the collection container 72. As a result, the airflow with the debris can flow into the collection container 72 and a relatively clean flow of fluid exits through the filter media 70. The valve 78 is operable to selectively close the filter 22 from entry/discharge of any debris. The valve 78 moves between a closed position (FIG. 9) for sealing the inlet opening 80 and an open position (FIG. 6) where debris is allowed to enter the collection chamber 72. Sealing the inlet opening 80 with the valve 78 inhibits discharge of debris when the filter 22 is changed. A seal may be provided between the valve 78 and upper housing 66 at the inlet opening 80. The seal may be an O-ring. Alternatively, the seal may be a resilient material such as a gasket or molded sealing surface. The valve 78 could be mounted to either the upper housing 66 or the inlet opening 80. When the filter 22 is de-coupled from the vacuum cleaner 10, the valve 78 is seated (FIG. 6) within the inlet opening 80. Consequently, fluid and particles are inhibited from entering or leaving the interior of the filter 22. When the filter 22 is coupled to the vacuum cleaner 10, the valve 78 is opened, thereby unseating the valve 78 from the inlet opening 80. As shown in FIG. 5, the valve 78 couples to the end of the conduit 60 when the filter 22 is coupled to the vacuum cleaner 10.

In the illustrated embodiment, a method of coupling the filter 22 to the vacuum cleaner 10 includes separating the outer housing 20 from the main body 12 and positioning the filter 22 in the outer housing 20. The outer housing 20 includes a shoulder 85 or other retaining feature configured to receive and locate the filter 22 in an installed orientation within the outer housing 20. In the illustrated embodiment, the method of coupling the filter 22 to the vacuum cleaner 10 further includes moving the outer housing 20 with positioned filter 22 in a direction generally along the dirt collection axis 74 coupling the outer housing 20 and filter 22 to the main body 12. The filter 22 in the installed orientation within the outer housing 20 is aligned with the conduit 60 such that moving the outer housing 20 and filter 22 toward the main body 12 along the dirt collection axis 74 during coupling causes the conduit 60 to extend into the filter 22 through the inlet opening 80 thereby unseating the valve 78 and connecting the conduit 60 to the dirt collection container 72.

With continued reference to FIGS. 5 and 6, the valve 78 includes a plurality of flexible fingers 79. The flexible fingers 79 engage the upper housing 66 around the inlet opening 80 retaining the valve 78 within the inlet opening 80. When the valve 78 is unseated, the flexible fingers 79 of the valve 78 release from the inlet opening 80, thereby opening the inlet opening 80 to provide fluid communication between the inlet opening 80 and the collection container 72. In other embodiments, the releasable connection between the valve 78 and the inlet opening 80 may be a variety of other connections (e.g., springs, snaps, tape, clips, friction fit, etc.).

In the illustrated embodiment, the valve 78 connects to the conduit 60 when the valve is unseated to hold the valve 78 on the conduit 60 while the valve 78 is open. The valve 78 may include a pocket 81. When the conduit 60 contacts the valve 78 with a sufficient force, corresponding features on the conduit 60 enter and couple to the pocket 81 (via the flexible fingers 79) connecting the valve 78 to the conduit 60. The connection of the valve 78 to the conduit 60 is such that the valve 78 remains on the conduit 60 until a predetermined valve-removal force is applied to the valve 78. The valve 78 may be retained on the conduit 60 by one or more connecting features, including connections such as magnetic force, frictional locking features, and interlocking features between the conduit and the valve retaining the valve to the conduit. In alternative embodiments, the valve 78 is not connected to the conduit 60, but is held to the upper housing 66 by a spring, hinge, tether, or other connection that allows the conduit 60 to open the inlet opening 80. In yet another alternative, the inlet opening 80 is not provided with a valve or is provided by a user-actuated closure such as a cover.

In the illustrated embodiment, the conduit 60 includes a first magnetic member 77 coupled adjacent a leading end of the conduit 60 corresponding to a second magnetic member 75 coupled to the valve 78. When the valve 78 connects to the conduit 60 as the valve is unseated, the first magnetic member 77 and second magnetic member 75 are magnetically attracted to one another at least partially coupling the valve to the conduit. The first magnetic member 77 magnetically couples the conduit 60 to the second magnetic member 75 generating a force that retains the valve 78 on the conduit 60 either alone or in combination with the flexible fingers 79 or other frictional or interlocking locking features. The first and second magnetic members may include any material that produces magnetic attraction between the first and second magnetic members. In the illustrated embodiment, the first magnetic member 77 is a magnet and the second magnetic member 75 is a metallic object such as a steel disc or slug coupled to the valve 78 (as illustrated by magnetic member 81 in FIG. 6 and 348 in FIG. 13).

The second magnetic member 75 may be positioned on an inner surface the valve opposite the conduit 60 such that the second magnetic member 75 is not visible from the exterior of the filter 22. In another embodiment, the second magnetic member 75 is positioned on an outer surface of the valve 78 adjacent the conduit 60. In another embodiment, the second magnetic member 75 is positioned internal to the valve 78 structure. In yet another alternative, the second magnetic member 75 is a material forming at least a portion of the valve, for example the valve being formed from steel or including a steel component, such that at least a portion of the valve 78 has intrinsic magnetic properties that interact with the first magnetic member 77 directly.

Figure 7:
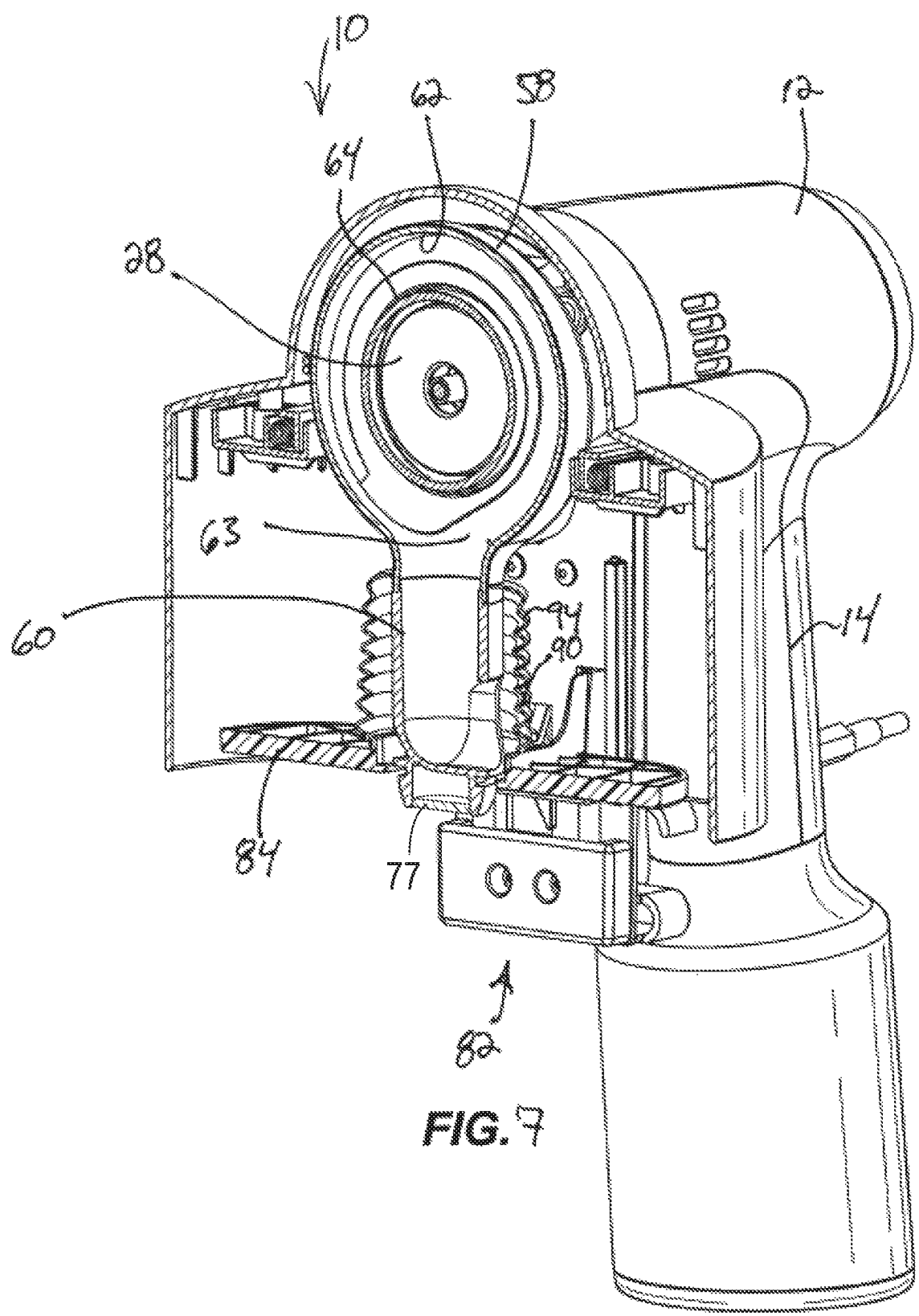
FIG. 7 is a cross-sectional view of the handheld vacuum cleaner taken along line 5-5 of FIG. 1, illustrating the filter removed from the handheld vacuum cleaner.
Figure 8:
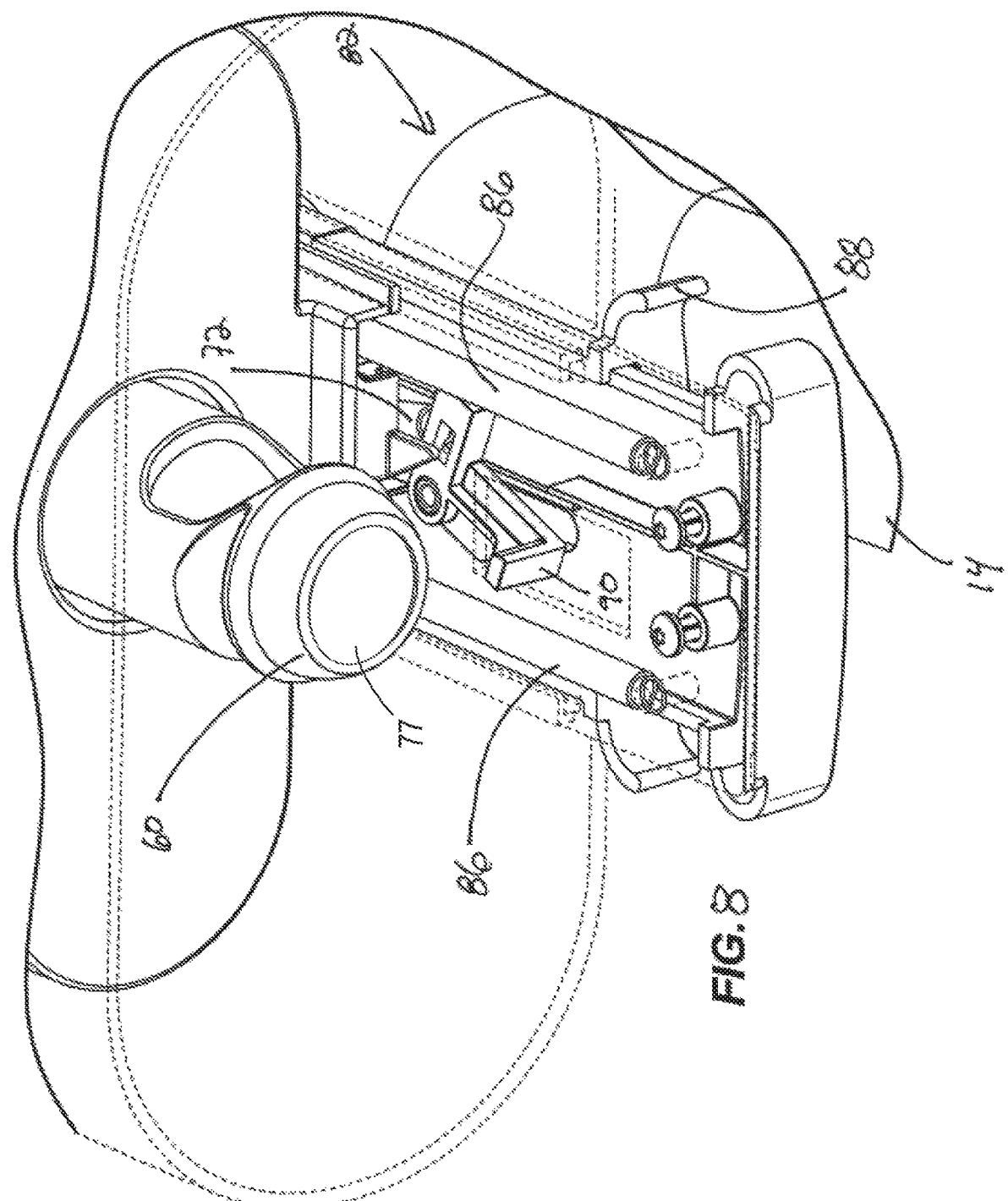
FIG. 8 is an enlarged perspective view of the handheld vacuum cleaner, illustrating filter release mechanism.

With reference to FIGS. 5-7, the vacuum cleaner 10 further includes a filter release mechanism 82 having a collar 84 slidably coupled to the vacuum 10 between an extended position (FIG. 6) and a retracted position (FIG. 5). The collar 84 is pressed by springs 86 toward the extended position. When the filter 22 is inserted into the outer housing 20, the upper housing 66 abuts the collar 84 moving the collar 84 from the extended to the retracted position. Thus, as the outer housing 20 is coupled to the main body 12, the collar 84 is forced toward the retracted position since the shoulder 85 maintains the position of the upper housing 66 relative to the housing 20 in the filter's installed orientation within the outer housing 20. In the illustrated embodiment, the springs 86 are selected to provide a pressing force that is less than the valve-removal force needed to release the valve 78 from the conduit 60. When the outer housing 20 is separated from the main body 12, the springs 86 of the collar 84 urge the filter 22 in the direction of the extended position until the filter upper housing 66 is contacting and retained by the valve 78 connected to the conduit 60. As such, the outer housing 20 is removed from the vacuum cleaner 10 while the filter 22 remains connected to the conduit 60 by the engagement of the valve 78 to the conduit 60. The filter release mechanism 82 is operable to provide a pressing force greater than the valve-removal force to release the valve 78 from the conduit 60 further urging the filter 22 off the remaining portion of the conduit 60, as explained in more detail below.

As shown in FIG. 7, the filter release mechanism 82 further includes an actuator 88 slidably coupled to the vacuum 10 and a pusher 90 (FIG. 7) pivotably coupled to the actuator 88. The actuator 88 is configured to be operated by a user between a rest position (FIG. 3), an intermediate position (moved slightly downward from the rest position and generally corresponding to the position of the filter upper housing 66 contacting and retained by the valve 78 connected to the conduit 60), and an extended position (moved further downward from the intermediate position and generally corresponding to the position of the filter upper housing 66 and valve 78 being released from the conduit 60). The pusher 90 moves between a first or vertical position (not shown) when the actuator 88 is in its intermediate and extended positions and a second or angled position (FIG. 7) when the actuator 88 is moving toward its rest position. When a user moves the actuator 88 from the rest position to the intermediate position, the pusher 90 moves to the first position and is located adjacent the upper housing 66 of the filter 22. When a user moves the actuator 88 from the intermediate position to the extended position applying a user-applied force greater than the valve-removal force, the pusher 90 passes through a slot in the collar 84 and exerts a force against the upper housing 66 to release the upper housing 66 and valve 78 from the conduit 60. In an alternative embodiment, the pusher 90 is adjacent the collar 84 when the actuator 88 is in the intermediate position, and moving the actuator 88 to the extended position causes the pusher 90 to press the collar 84 against the upper housing 66 to release the upper housing 66 from the conduit 60. The pusher 90 is moved via a spring 92 toward the first position as the actuator 88 moves to its intermediate and extended positions.

The vacuum cleaner 10 of the illustrated embodiment further includes a sleeve 94 (FIG. 6) that covers the conduit 60 when the collar 84 is in the extended position. Specifically, the sleeve 94 covers the conduit 60 when the filter 22 is removed from the conduit 60. As such, the sleeve 94 inhibits dirt from falling out of the conduit 60 when the filter 22 is removed from the vacuum 10. In some cases, the sleeve 94 is a flexible bellow-type sleeve that moves in response to movement of the collar 84.

In operation, the filter 22 is placed within the outer housing 20 and the outer housing 20 is then coupled to the main body 12. As the outer housing 20 is coupled to the main body 12, the upper housing 66 of the filter 22 abuts the collar 84 and the collar 84 is forced upward (toward the retracted position) and the inlet opening 80 receives the conduit 60. As the conduit 60 engages the valve 78 as the conduit 60 extends into the dirt collection container 72, the valve 78 is unseated from the inlet opening 80 and coupled to the end of the conduit 60, as shown in FIG. 5. Once the filter 22 is full of debris, an operator removes the filter 22 from the vacuum 10 without an operator touching the filter 22. Specifically, the operator releases and separates the outer housing 20 from the main body 12. As the outer housing 20 separates from the main body 12, the springs 86 urge the collar 84 downward, thereby exerting a force on the upper housing 66 of the filter 22 toward the collar extended position. The valve 78 being coupled to the conduit 60 retains the upper housing 66 on the conduit 60. At this point, an operator moves the actuator 88 downward in order to pivot the pusher 90 from the second position toward the first position and enables the operator to exert a force greater than the valve-removal force. As such, the pusher 90 exerts the valve-removal force on the collar 84 or upper housing 66 of the filter 22 sufficient to re-seat the valve 78 into the inlet opening 80 of the filter 22 and eject the filter 22 from the conduit 60. The sleeve 94 covers the conduit 60 when the filter 22 is removed from the conduit 60 to ensure that debris remaining in the conduit 60 (if any) does not inadvertently fall out.

In the illustrated embodiment, the conduit 60 is fixed relative to the main body 12, and the outer housing 20 and the filter 22 are movable and releasable relative to the main body 12. It will be appreciated that in alternative constructions the conduit 60 may be movable relative to the main body 12 such that the conduit 60 moves at least partially into engagement with the filter 22. Alternatively or additionally, in various embodiments the conduit 60 may not extend into the dirt collection container 72 but instead abuts the inlet opening 80 on the filter 22 to direct air and debris into the dirt collection container 72.

In the illustrated embodiment, the outer housing 20 is removable from the vacuum cleaner 10 while the filter 22 remains connected to the conduit 60, the filter 22 being subsequently releasable from the conduit 60 after the outer housing 20 is removed. In one alternative, the filter 22 and the outer housing 20 are connected together such that the outer housing 20 is not removable from the vacuum cleaner 10 without the filter 22. In this alternative embodiment, the actuation of the housing release mechanism 52 uncouples the outer housing 20 and the collar 84 urges the filter 22 and the outer housing 20 together in the direction of the extended position until the filter upper housing 66 is contacting and retained by the valve 78 connected to the conduit 60. The outer housing 20 and the filter 22 together remain connected to the conduit 60 by the engagement of the valve 78 until a user grasps the outer housing 20 and pulls it away from the main body 12 with sufficient force to release the valve 78 from the conduit 60, thereby reseating the valve 78 in the inlet opening 80. Optionally, the filter release mechanism 82 may be provided in this alternative embodiment providing a mechanism for releasing the filter 22 and outer housing 20 from the conduit 60.

In the illustrated embodiment, the suction source 28 is provided between the suction inlet 16 and the filter 22 such that the airflow mixed with debris passes through the suction source 28 en route to the filter 22 arranged as a "dirty air" system. It will be appreciated that in alternative constructions the suction source 28 could be provided downstream of the filter 22 arranged as a "clean air" system.

Figure 10:
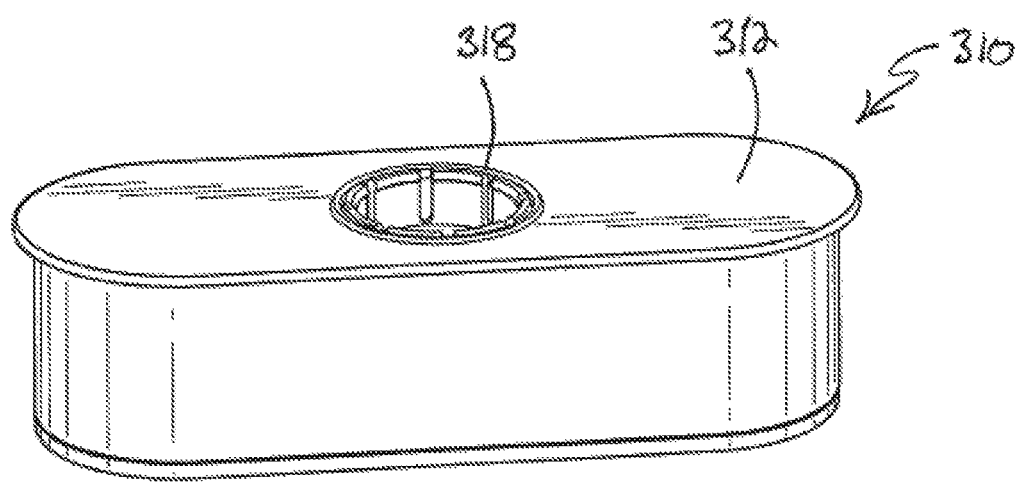
FIG. 10 is a perspective view of a filter in a collapsed position according to an embodiment of the invention.
Figure 11:
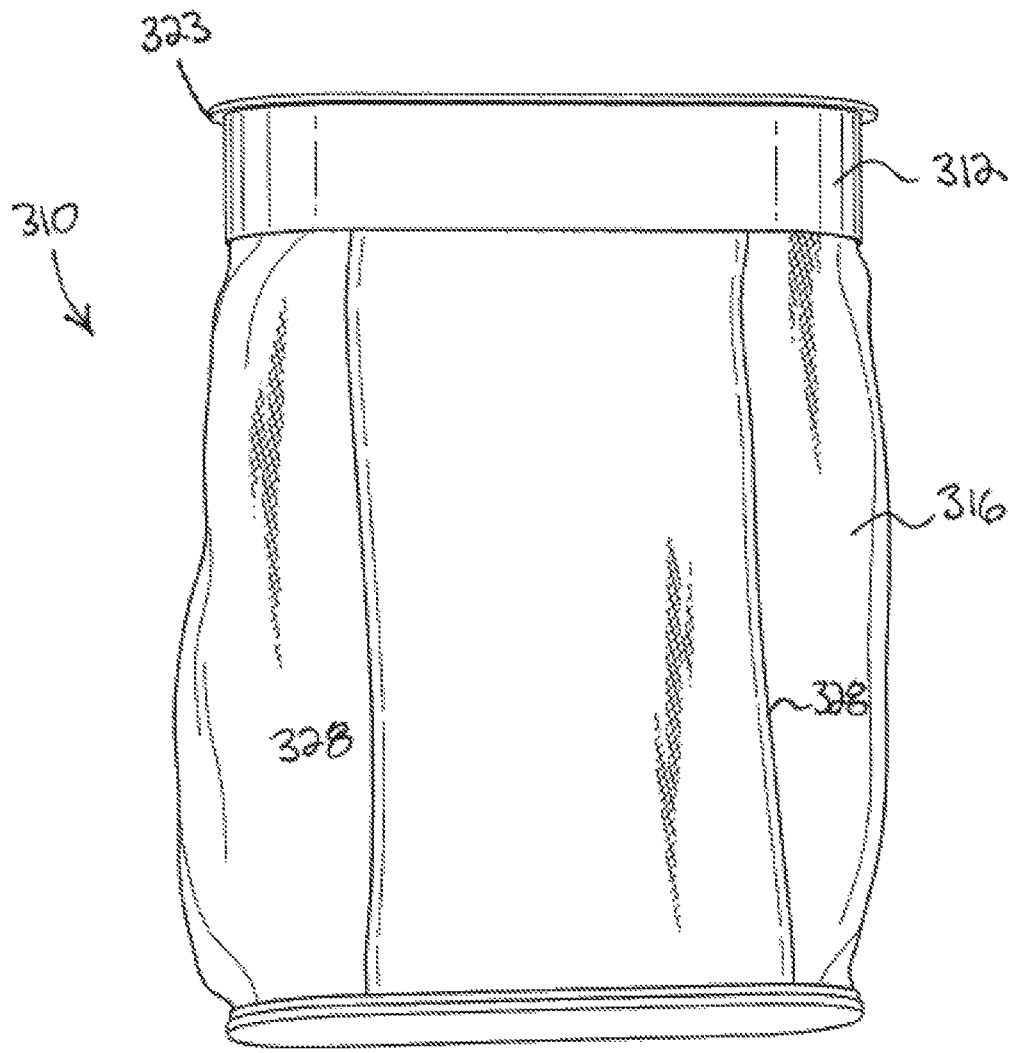
FIG. 11 is a perspective view of the filter of FIG. 10 in an expanded position.

FIGS. 10 and 11 illustrate a filter 310. The filter 310 can move between a collapsed position (FIG. 10) and an expanded position (FIG. 11). The filter 310 may be supplied to the consumer in the collapsed position. Then, in one embodiment, the filter 310 is installed in a device in the collapsed position and then automatically moves to the expanded position. The filter 310 can automatically move to the expanded position by air pressure, gravity, mechanical push or pull, etc. In an alternative embodiment, the consumer moves the filter to the expanded position prior to installing the filter into a device. The filter 310 can be used to filter any suitable fluid in several applications. For example, the filter 310 can be used in vacuum cleaners, air purifiers, HVAC systems, automotive applications, etc.

With reference to FIGS. 10 and 11, the filter 310 includes a first or upper housing 312, a second or lower housing 314, and filter media 316. The upper housing 312 includes an inlet opening 318 that provides fluid communication into the filter 310. In some embodiments, a valve 319 is located within the inlet opening 318 to open and close the inlet opening 318. For example, when the filter 310 is ready to be removed from the device (e.g., vacuum), the valve 319 is closed so that debris within the filter 310 does not escape through the inlet opening 318. The upper housing 312 has an inner volume 320 (see FIG. 14A) within the housing 312. Likewise, the lower housing 314 includes an inner volume 321. The inner volumes 320, 321 of the upper housing 312 and the lower housing 314 can be equal or one of the volumes can be greater than the other. In various alternatives, the inner volumes of one or both of the upper housing and the lower housing are small or inappreciable due to the shape of the housing. The upper housing 312 and the lower housing 314 can be formed from any suitable material, such as thermoplastic material, thermoset material, molded paper pulp, formed or molded filter media, or any other suitable material. Alternatively or additionally, the upper housing 312 forms a support collar 323 for installing the filter 310 in a vacuum cleaner.

With reference to FIG. 12, the filter media 316 includes a first end 322 and a second end 324. The filter media 316 is coupled to the upper housing 312 proximate the first end 322 while, the filter media 316 is coupled to the lower housing 314 proximate the second end 324. An inner volume 326 of the filter media 316 is defined between the first end 322 and the second end 324 of the filter media 316. Optionally, the filter media 316 includes one or more pleats 328 extending between the first end 322 and the second end 324. The pleats 328 enable the filter 310 to enlarge beyond the expanded position in a direction transverse to the direction traveled between the collapsed and expanded positions. In other words, the pleats 328 allow the filter 310 to billow outward in order to collect and store additional debris as the filter 310 fills. The illustrated filter media 316 typically includes a seam 330. Generally, the filter media 316 is a flat piece that is made tubular by joining two ends together, thereby creating the seam 330. As shown, the seam 330 is located within one of the pleats 328 to substantially hide the seam 330. The seam 330 can be formed by sewing, heat welding, crimping, or other suitable means of coupling the two ends together.

With reference to FIGS. 10 and 11, the filter 310 can move between a collapsed position (FIG. 10) and an expanded position (FIG. 11). In the collapsed position, the filter media 316 is located within the inner volume 320 of the upper housing 312 and/or in the inner volume of the lower housing 314. Also, the upper housing 312 and the lower housing 314 enclose the filter media 316 in the collapsed position. In some embodiments, the upper housing 312 and/or lower housing 314 can snap or otherwise connect together to retain the filter 310 in the collapsed position by interlocking features provided in the upper and lower housings. Alternatively, the filter 310 may be held in the collapsed position by tape, film, bag, or other attachments. Typically, the filter 310 would be supplied to the user in the collapsed position. In the expanded position, the filter media 316 generally expands out to an operative length and is ready for use as a filter. In some applications, the filter 310 automatically moves from the collapsed position to the expanded position. For example, when a flow of dirty fluid enters the filter 310 through the inlet opening 318, the pressure of the fluid automatically expands the filter 310. In other applications, gravity may automatically expand the filter 310, or a mechanism may be used to push or pull one or both housings away from the other.

The inner volume 326 of the filter media, along with the inner volume 320 of the upper housing 312, and the inner volume 321 of the lower housing 314 together define a collection container 332 that stores debris separated by the filter media 316. That is, a dirty fluid (e.g., air and dust, dirt, or other particles) travels into the filter 310 through the inlet opening 318. The dirt or dust is separated from the air flow by the filter media 316 and relatively clean air flows out of the filter 310 through the filter media 316 between the housings 312, 314. This airflow is generally represented by the arrows 334.

The filter 310 further includes a first attachment member 336 that couples the filter media 316 to the upper housing 312. In the illustrated embodiments, the filter media is folded over the first attachment member 336 between the first end 322 and the second end 324 of the filter media 316, but generally closer to the first end 322, before it is connected to the upper housing 312. Stated another way, all or a portion of the first end 322 of the filter media 316 is folded over before being coupled to the upper housing 312. Similarly, the filter 310 includes a second attachment member 338 that couples the filter media 316 to the lower housing 314 between the first end 322 and the second end 324 of the filter media 316, but closer to the second end 324. The first attachment member 336 is received within a groove 340 of the upper housing 312 holding the filter media in place, whereas the second attachment member 338 is received within a groove 342 of the lower housing 314. The grooves 340, 342 are formed with an inner wall 341 and an outer wall 343 (FIG. 14B). As shown in FIG. 14A, the height H1 of the outer wall 343 is greater than the height H2 of the inner wall 341. In an alternative embodiment, the height H1 of the outer wall 343 is the same as the height H2 of the inner wall 341.

To couple the filter media 316 to the upper housing 312 in the illustrated embodiment, all or a portion of the end of the filter media 316 is folded over the first attachment member 336 and fitted into the groove 340 of the upper housing 312. As such, the filter media 316 is disposed between the groove 340 and the first attachment member 336. The fit between the groove 340 and the attachment member 336 with filter media 316 is a friction or limited clearance fit to wedge the filter media 316 and attachment member 336 into the groove 340 to couple the filter media 316 to the upper housing 312. Alternatively, the attachment member 336 is staked, welded, snap fit, adhered, or otherwise fastened to the upper housing 312 to couple the filter media 316 to the upper housing 312. In one alternative, at least a portion of the edge 322 of the first end 322 of the filter media 316 is retained in the groove 340 by fitting the attachment member 336 into the groove 340. The connection of the filter media 316 to the upper housing 312 is provided around the upper housing 312 inhibiting airflow through the connection.

To couple the filter media 316 to the lower housing 314, the filter media 316 is wrapped around the second attachment member 338 and fitted into the groove 342 of the lower housing 314 in a similar way as described for the filter media 316 coupling to the upper housing 312. As such, the filter media 316 is retained in the groove 342 by fitting the second attachment member 338 into the groove 342. The connection of the filter media 316 to the lower housing 314 is provided around the lower housing 314 inhibiting airflow through the connection. In various alternatives, the connection of the filter media 316 to the lower housing 314 may use a different method than the connection to the upper housing 312. In one alternative, the filter media 316 does not use a lower housing 314, instead closing the second end 324 with a seam or other closure.

With continued reference to FIGS. 13-1, the filter 310 may include a first overlapping filter media section 344 and a second overlapping filter media section 346. The first overlapping filter media section 344 is proximate the upper housing 312 and is a result of the first end 322 of the filter media 316 being folded such that at least a portion of the first end 322 extends away from the housing 312 forming the overlapping filter media section 344. In the illustrated embodiment, the first end 322 of the filter media 316 is folded over the attachment member 336 in a manner that the first end 322 extends away from the upper housing 312 a desired length. As such, the filter media 316 overlaps to provide two layers at the first overlapping filter media section 344. The first overlapping filter media section 344 may extend around the perimeter of the filter 310 or may extend along one or more portions of the perimeter of the filter 310. In certain embodiments, all or desired portions of the overlapping filter media 344 may be trimmed, or filter media 316 positioned such that a desired amount of filter media 316 extends beyond the attachment member 336 in predetermined locations. In the embodiment shown in FIG. 14A, the first overlapping filter media section 344 includes a notch 345 in a portion. The second overlapping filter media section 46 is proximate the lower housing 314 and is a results of the second attachment member 338 bending the filter media 316 in a manner that the second end 324 extends away from the lower housing 314. As such, the filter media 316 overlaps to provide two layers and forms the second overlapping filter media section 346. The second overlapping filter media section 346 may extend around the perimeter of the filter 310 or may extend along one or more portions of the perimeter of the filter 310. In certain embodiments, all or desired portions of the overlapping filter media 46 may be trimmed, or filter media 316 positioned such that a desired amount of filter media 316 extends beyond the second attachment member 338 in predetermined locations. In the illustrated embodiment, both of the first and second overlapping filter media sections 344, 346 are disposed in the inner volume 326 of the filter media 316. However, for certain embodiments the filter 310 may be constructed with the overlapping filter media portions 344, 346 being positioned to the outside of the filter 310.

Although the invention has been described in detail with reference to certain preferred embodiments, variations and modifications exist within the scope and spirit of one or more independent aspects of the invention as described.

What is claimed is:

1. A vacuum cleaner comprising:
   a suction inlet and a suction source configured to draw debris through the suction inlet;
   a conduit in fluid communication with the suction inlet, the conduit including a first magnetic member;
   a filter having an inner volume configured to collect debris from the conduit, the filter having a valve releasably connected to a filter inlet opening, the valve including a second magnetic member, the first and second magnetic members being attracted to one another; and
   the filter being moveable from a first position to a second position, wherein the filter in the first position is in fluid communication with the conduit with the valve being disengaged from and opening the filter inlet opening to collect the debris, and wherein the filter in the second position is disconnected from the conduit with the valve closing the filter inlet opening.

2. The vacuum cleaner of claim 1, wherein movement of the filter to the first position disconnects the valve from the filter inlet opening and magnetically couples the valve to the conduit.

3. The vacuum cleaner of claim 2, wherein the valve includes flexible fingers on an outer periphery thereof to engage the inlet opening, and the valve includes a pocket that receives the conduit.

4. The vacuum cleaner of claim 3, wherein the flexible fingers are configured to couple the valve to the conduit.

5. The vacuum cleaner of claim 1, wherein the first magnetic member is a magnet and the second magnetic member includes a material attracted by a magnet.

6. The vacuum cleaner of claim 1, wherein the second magnetic member is a material forming at least a portion of the valve.

7. The vacuum cleaner of claim 1, wherein movement of the filter from the first position to the second position connects the valve to the filter inlet opening and releases the valve from the conduit.

8. The vacuum cleaner of claim 7, wherein the valve is coupled to the conduit by magnetic force between the conduit and the valve retaining the valve to the conduit until the valve connects to the filter inlet opening during movement of the filter to the second position.

9. The vacuum cleaner of claim 8, wherein the valve remains coupled to the conduit until a force pressing the valve away from the conduit exceeds a pre-determined threshold.

10. A filter configured to separate debris from a flow of fluid in a vacuum cleaner having a conduit for coupling to the filter, the conduit including a conduit magnetic member, the filter comprising:
    a housing;
    a filter media coupled to the housing to form a collection container having an inner volume configured to store debris separated by the filter media from the flow of fluid;
    an inlet opening extending through the housing; and
    a valve releasably connected to the inlet opening, the valve movable between an opened position and a closed position, movement of the valve to the open position disconnects the valve from the inlet opening and the housing, the valve including a valve magnetic member, the valve magnetic member and conduit magnetic member being attracted to one another;
    wherein the inlet opening provides fluid communication into the collection container when the valve is in the opened position such that the flow of fluid with the debris can flow into the collection container and a relatively clean flow of fluid exits through the filter media.

11. The filter of claim 10, wherein the valve includes flexible fingers on an outer periphery thereof to engage the inlet opening, and the valve includes a pocket that receives the conduit.

12. The filter of claim 10, wherein the conduit magnetic member is a magnet and the valve magnetic member includes a material attracted by a magnet.

13. The filter of claim 10, wherein the valve magnetic member is a material forming at least a portion of the valve.

14. The filter of claim 10, further comprising a seal between the valve and the housing at the inlet opening.

* * * * *